United States Patent [19]

Brinkley

[11] Patent Number: 5,227,072
[45] Date of Patent: Jul. 13, 1993

[54] METHOD OF RECOVERING OIL-BASED FLUID

[76] Inventor: Herman E. Brinkley, Hi-Way One, PO Box 450, Lawrenceville, Ill. 62439

[21] Appl. No.: 700,493

[22] Filed: May 15, 1991

[51] Int. Cl.$^5$ .................. B01D 15/00; E02B 15/04
[52] U.S. Cl. .................. 210/671; 210/693; 210/924
[58] Field of Search ............ 210/680, 691, 693, 242.4, 210/924, 791, 505, 507, 671

[56] References Cited

U.S. PATENT DOCUMENTS

| Re. 31,087 | 11/1982 | Sohl | 210/924 |
|---|---|---|---|
| 3,146,192 | 8/1964 | McClintock | 210/693 |
| 3,147,216 | 9/1964 | Oemler | 210/693 |
| 3,667,608 | 6/1972 | Burroughs et al. | 210/242.4 |
| 3,679,058 | 7/1972 | Smith | 210/924 |
| 3,739,913 | 6/1973 | Bogosian | 210/924 |
| 3,744,638 | 7/1973 | Rhodes | 210/924 |
| 4,052,306 | 10/1977 | Schwartz et al. | 210/924 |
| 4,065,923 | 1/1978 | Preus | 210/924 |
| 4,133,088 | 1/1979 | Hikobe et al. | 210/924 |
| 4,377,478 | 3/1983 | Rolls et al. | 210/924 |
| 4,395,336 | 7/1983 | Eng | 210/693 |
| 4,416,782 | 11/1983 | Kerres | 210/693 |
| 5,002,814 | 3/1991 | Knack et al. | 210/242.4 |
| 5,084,171 | 1/1992 | Murphy et al. | 210/924 |

FOREIGN PATENT DOCUMENTS

| 971568 | 1/1951 | France | 55/DIG. 44 |
|---|---|---|---|
| 0094612 | 7/1980 | Japan | 55/DIG. 44 |

Primary Examiner—Robert A. Dawson
Assistant Examiner—Sun Uk Kim
Attorney, Agent, or Firm—Wood, Phillips, VanSanten, Hoffman & Ertel

[57] ABSTRACT

A method of recovering oil-based fluid and an article for use in the method disclosed, the method includes the steps of applying fibers or a cloth with a napped surface that absorb the oil-based fluid to the oil-based fluid on a surface. The fiber or cloth is capable of absorbing at least about 5 times its own weight in oil-based fluid and temporarily holding absorbed oil-based fluid therein until the absorbed oil-based fluid is recovered. The fiber or cloth is maintained in contact with the oil-based fluid until oil-based fluid is absorbed. Then, the fiber or cloth having absorbed oil-based fluid is retrieved from the surface. The oil-based fluid can be recovered from the fiber or cloth and put to a beneficial use. The fiber or cloth can be reused repeatedly. The article contains the fiber or cloth, can optionally contain a flotation material and can optionally have a container that holds the fiber or cloth.

29 Claims, 3 Drawing Sheets

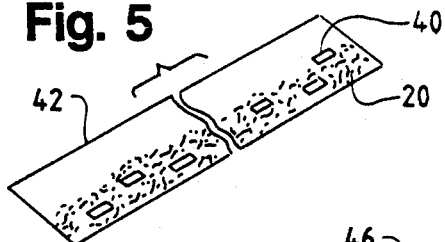
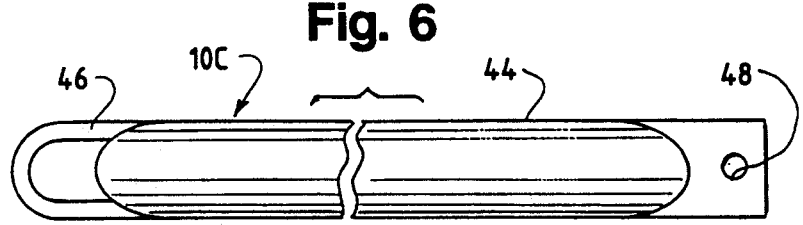
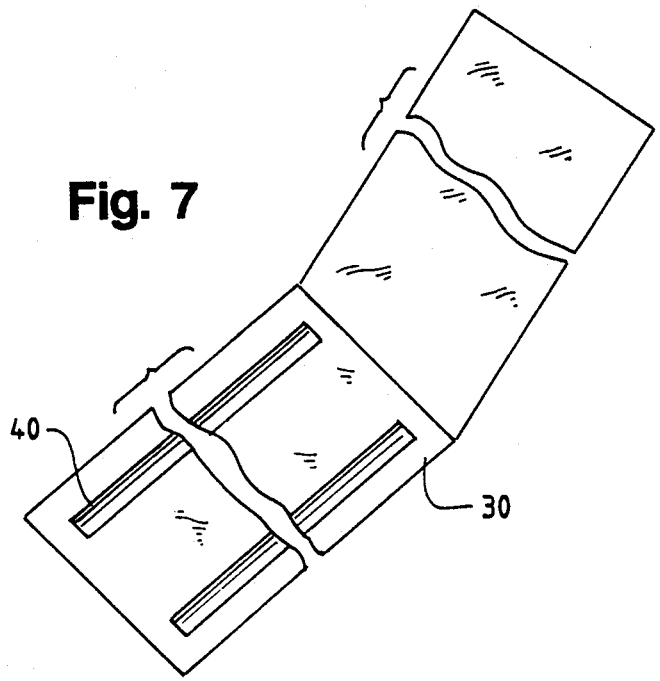
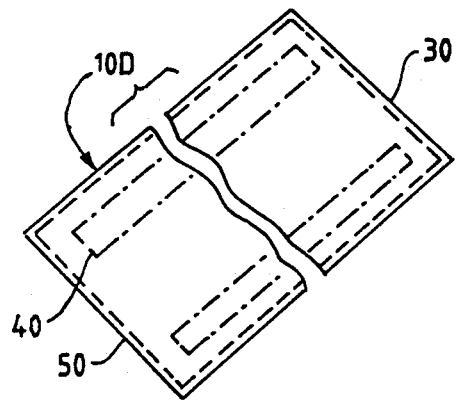
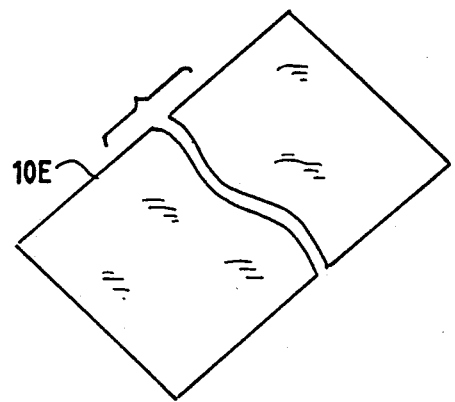

METHOD OF RECOVERING OIL-BASED FLUID

TECHNICAL FIELD

The present invention relates to a method for recovering spilt oil-based fluid and an oil-based fluid absorbent article for use in the method. In particular, the present invention relates to a method that utilizes man-made fibers capable of absorbing oil-based fluid in an amount of at least about 5 times the weight of the fibers and also relates to an oil-based fluid absorbent article made of the man-made fibers.

BACKGROUND OF THE INVENTION

Oil-based fluid spills pose environmental and health hazards and therefore are very troublesome whether they occur on a body of water or on a floor. Oil-based fluids include crude oil, fuel oil and the like. Many methods, articles and apparatuses are known to pick up oil-based fluid spills. Unfortunately, they have shortcomings.

Often the first step in picking up an oil-based fluid spill is containment to inhibit or prevent the oil-based fluid spill from spreading. Containment booms are positioned around the oil-based fluid spill to try to contain the spill. When the spill occurs on water, the containment boom typically has a flotation element that floats on top of the water and extends above the oil-based fluid and a downwardly extending skirt that extends below the oil-based fluid and into the water. The flotation element can be made of Kapok, styrofoam, styrofoam coated with polyurethane and the like. The skirt can be made of rubberized canvas or other material that is oil-based fluid impermeable. The material of the skirt can cover the flotation element.

Unfortunately, the action of the water due to the waves or the current can force the oil-based fluid over the flotation element. Also, the action can cause the skirt to sway towards and away from the oil-based fluid spill. When the skirt sways away from the oil-based fluid spill the skirt can pull the oil-based fluid underneath the skirt and hence outside of the containment boom.

The flotation element is designed to have little or no capability to absorb oil-based fluid or water. If the flotation element did absorb oil-based fluid or water this would result in an increase in the weight of the containment boom which would then ride lower in the spill and more readily permit oil-based fluid to be forced thereover. Once the oil-based fluid is outside of the containment boom the containment boom is useless.

After the spill has been cleaned up, the containment boom must either be cleaned, which is a time consuming and expensive process, or disposed of as by burning or burial in a landfill. These possible options are undesirable as they create environmental and health hazards. Also, the boom can only be reused a relatively few number of times, e.g., less than about five times. Furthermore, the oil-based fluid coating the containment boom is not recovered for subsequent use and therefore becomes an environmental and health hazard.

For large oil-based fluid spills on water, skimmers are employed after the containment booms have been positioned. The skimmers pick up the oil-based fluid but also pick up relatively large amounts of water that contaminate the oil-based fluid to create a water and oil-based fluid mixture. If it is desired to use the oil-based fluid rather than waste it by disposing of it, the water contamination must be removed as by heating the water which is a time consuming and expensive process. Alternatively, the water and oil-based fluid mixture can be disposed of which creates environmental and health hazards. Furthermore, the presence of the water in the mixture increases the volume of the material to be disposed of which increases the economic and environmental cost.

When the spill occurs on a solid surface, oil-based fluid absorbent clays can be utilized to contain and/or pick up the spill. The oil-based fluid absorbent clays can be packed in an oil-based fluid permeable cloth to make handling easier. Unfortunately, the oil-based fluid cannot be recovered from the clay and the clay must be disposed of with the attendant problems.

The spill can be picked up using wipes. The use of wipes is especially advantageous for small spills on a solid surface and for oil-based fluid that has washed ashore. Unfortunately, these wipes have relatively poor absorption characteristics and absorb relatively little oil-based fluid for their own weight. Often, these wipes are only utilized once and then must be disposed of with the attendant disposal problems. Some wipes appear to be made of non-woven wood fibers.

A method of recovering oil-based fluid and a reusable oil-based fluid absorbent article capable of recovering spilt oil-based fluid so that the oil-based fluid can be used and that overcome at least some of the shortcomings of the prior art are desirable.

SUMMARY OF THE INVENTION

The present invention is directed to a method of recovering oil-based fluid from a surface that has oil-based fluid thereon. The method includes the steps of applying to the oil-based fluid on the surface man-made fibers that absorb the oil-based fluid and absorbing, with the fibers, oil-based fluid in an amount of at least about 5 times the weight of the fibers. The method can also include the steps of removing the fibers having absorbed oil-based fluid from the surface, recovering a significant portion of the absorbed oil-based fluid from the fibers and reapplying to the oil-based fluid on the surface the fibers having oil-based fluid recovered therefrom The removing, recovering and reapplying steps can be repeated.

Alternative methods include applying to the oil-based fluid on the surface the fibers and a flotation material for supporting the flotation of the fibers on the surface, applying an oil-based fluid absorbent cloth of the man-made fiber, or applying an absorbent cloth and a flotation material for supporting the flotation of the cloth on the surface. The steps of absorbing, removing, recovering and reapplying can be performed.

The present invention is also directed to an oil-based fluid absorbent article The article can be the fibers and the flotation material; the cloth and the flotation material; or the fibers, the cloth and the flotation material, or an oil-based fluid permeable container that holds the fibers or the cloth. The flotation material can also be held within the container. The article is capable of absorbing oil in an amount of at least about 5 times the weight of the fiber or cloth present in the article. The absorbed oil-based fluid can be recovered from the article and the article can be reused to absorb oil-based fluid.

The cloth preferably has at least one napped surface to provide additional surface area for absorbing the oil-based fluid. The cloth can also be a sheet-form cloth with the article being the sheet-form cloth having the flotation material between sheets.

The fibers and cloth absorb many times their own weight in oil-based fluid which permits a relatively small amount of fibers or cloth to absorb a relatively large amount of oil-based fluid. This reduces the weight of the fibers or cloth that must be transported to the spill site which reduces transportation costs. After the oil-based fluid is recovered from the fibers or cloth the fibers or cloth can be reused and the cycle of absorbing the oil-based fluid with the fibers or cloth and recovering oil-based fluid therefrom can be repeated many times. This reusability is very beneficial as it minimizes the amount of fibers or cloth that needs to be utilized which in turn reduces the quantity of fibers and cloth that are needed at the spill.

The fibers and cloth are highly oleophilic. Therefore, when the surface is a water surface, e.g., an ocean, lake, stream or the like, the fibers or cloth will absorb the oil-based fluid and very little, if any, water. Thus, the oil-based fluid recovered from the fibers or cloth will have at most only very little water which can be evaporated away by applying heat.

The recovered oil-based fluid can be utilized as if it had not been spilt. Thus, the oil is an asset as it has commercial value as opposed to an environmental liability which occurs when many conventional methods of cleaning up oil-based fluid spills, especially spills on water.

The method and article are especially useful for recovering oil-based fluid spilled on water surfaces. Absorbent containment booms of the absorbent fibers or cloth can be positioned around an oil-based fluid spill. As the absorbent containment boom will absorb oil-based fluids due to the presence of the absorbent fibers or cloth, oil that comes in contact therewith can be absorbed as opposed to conventional booms that do not absorb oil-based fluids. Thus, if oil-based fluid is forced past the absorbent containment boom, the oil-based fluid can be absorbed if it remains in contact with the absorbent containment boom. This is in sharp contrast to a conventional boom that does not absorb oil-based fluid and has no effect on the oil-based fluid once the oil-based fluid is forced past the conventional containment boom. Also, the absorbent containment boom can be removed, the oil-based fluid absorbed therein recovered, and the boom reused numerous times. Conventional containment booms are typically discarded after at most a few uses resulting in the creation of environmental and health hazards.

Numerous other advantages and features of the present invention will become readily apparent from the following detailed description of the invention, the figures and the appended claims.

BRIEF DESCRIPTION OF THE DRAWINGS

FIG. 5 illustrates components of an article including some fibers and optional flotation material on a container material;

FIG. 6 illustrates the article made using a container;

FIG. 7 illustrates components of an alternative article including flotation material on absorbent cloth;

FIG. 8 illustrates the alternative article made of the components of FIG. 7; and FIG. 9 illustrates an alternative embodiment of the article that does not have flotation material.

DETAILED DESCRIPTION OF THE PREFERRED EMBODIMENT

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

Figure 1:
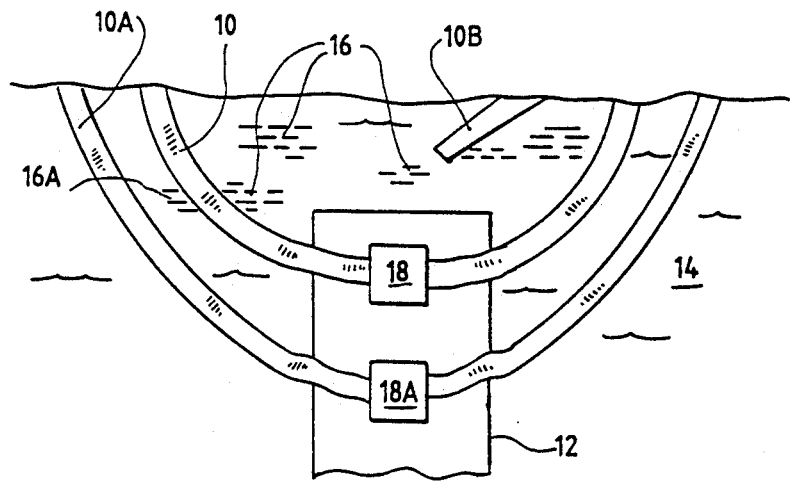
FIG. 1 is a top elevational view of oil-based fluid absorbent articles of the present invention being utilized to contain and recover oil-based fluid spilt upon water.

FIG. 1 illustrates a representative environment in which a first oil-based fluid absorbent article 10 of the present invention can be utilized. The article 10 is shown being utilized as a containment boom and extends from a platform 12 that can be a barge, pier or the like into the water 14 and encircles oil-based fluid 16 that is floating on the surface of the water 14. A second oil-based fluid absorbent article 10A is deployed as a containment boom to contain oil-based fluid 16A that may be forced past the first oil-based fluid absorbent article 10 as by the action of the waves or current. The first oil-based fluid absorbent article 10 can absorb this oil-based fluid 16A if contact between the first oil-based fluid absorbent article 10 and the oil-based fluid 16A is maintained. The second oil-based fluid absorbent article 10A is positioned to contain and/or absorb the oil-based fluid 16A that is not contained or absorbed by the first oil-based fluid absorbent article 10.

Recovery apparatuses 18 and 18A can be utilized to recover oil-based fluid absorbed by the absorbent articles 10 and 10A, respectively The apparatuses 18 and 18A are carried on the platform 12 and can retrieve the absorbent articles 10 and 10A from the water 14 onto the platform 12, recover the oil-based fluid therefrom by compression and dispense the absorbent articles 10 and 10A back on top of the water 14. The recovered oil-based fluid (not shown) can be stored on the platform 12, pumped into a tanker (not shown) or on-shore facility (not shown).

The term "recover" as used in its various grammatical forms in conjunction with the oil-based fluid absorbed by the fiber or cloth, means that the absorbed oil-based fluid can be taken from the fiber or cloth and beneficially used.

To further facilitate recovery of the oil-based fluid a number of absorbent articles as represented by oil-based fluid absorbent article 10B, can be positioned within the oil-based fluid 16 to absorb the same. Absorbent articles 10B can be utilized to recover the bulk of the oil-based fluid 16 thereby permitting the first absorbent article 10 to function more as a containment boom. Recovery of the oil-based fluid from the absorbent article 10B can be accomplished utilizing a recovery apparatus (not shown) that can be on the platform 12 or on a second platform (not shown).

Figure 2:
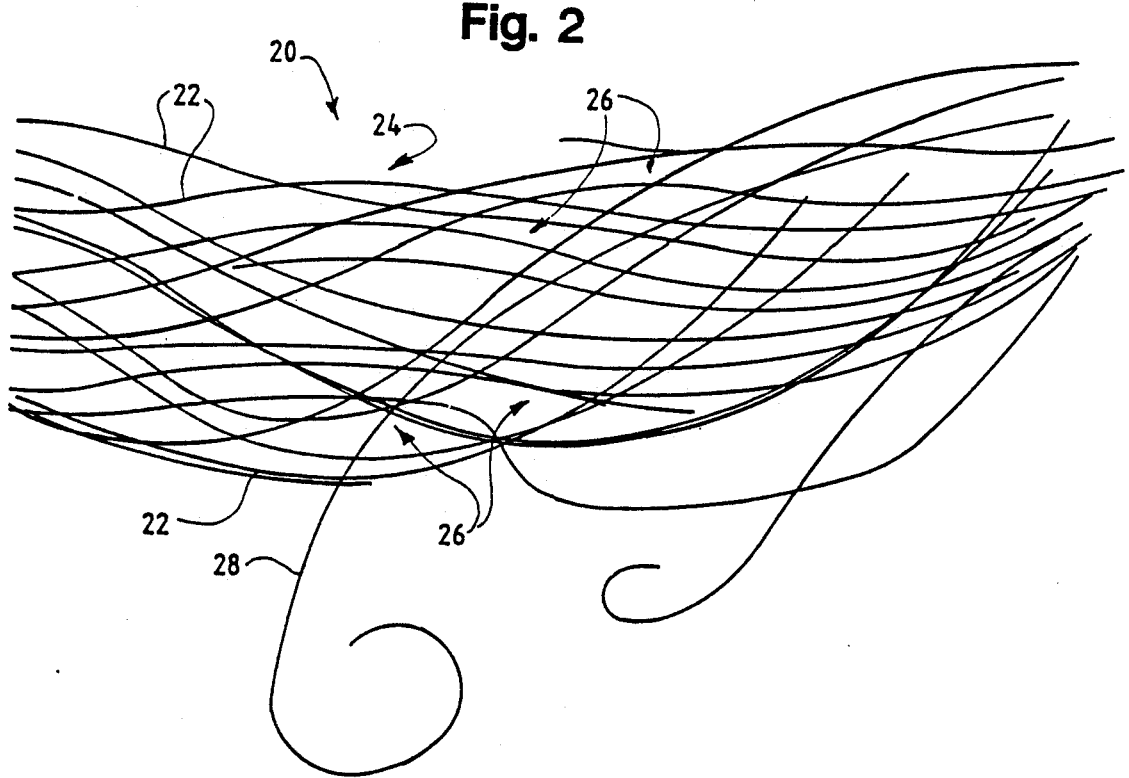
FIG. 2 is a magnified view of a fiber showing individual filaments.

FIG. 2 illustrates a magnified fiber 20 made up of numerous filaments 22. A twist 24 of the filaments 22 can be present to assist in maintaining the integrity of the fiber 20. Interstices 26 can be defined by filaments 22 that are adjacent to each other. It is presently believed that oil-based fluid (not shown) can be contained within the interstices 26 as well as between adjacent fibers (not shown). The filaments 22 can have smooth surfaces 28 along their length.

Figure 3:
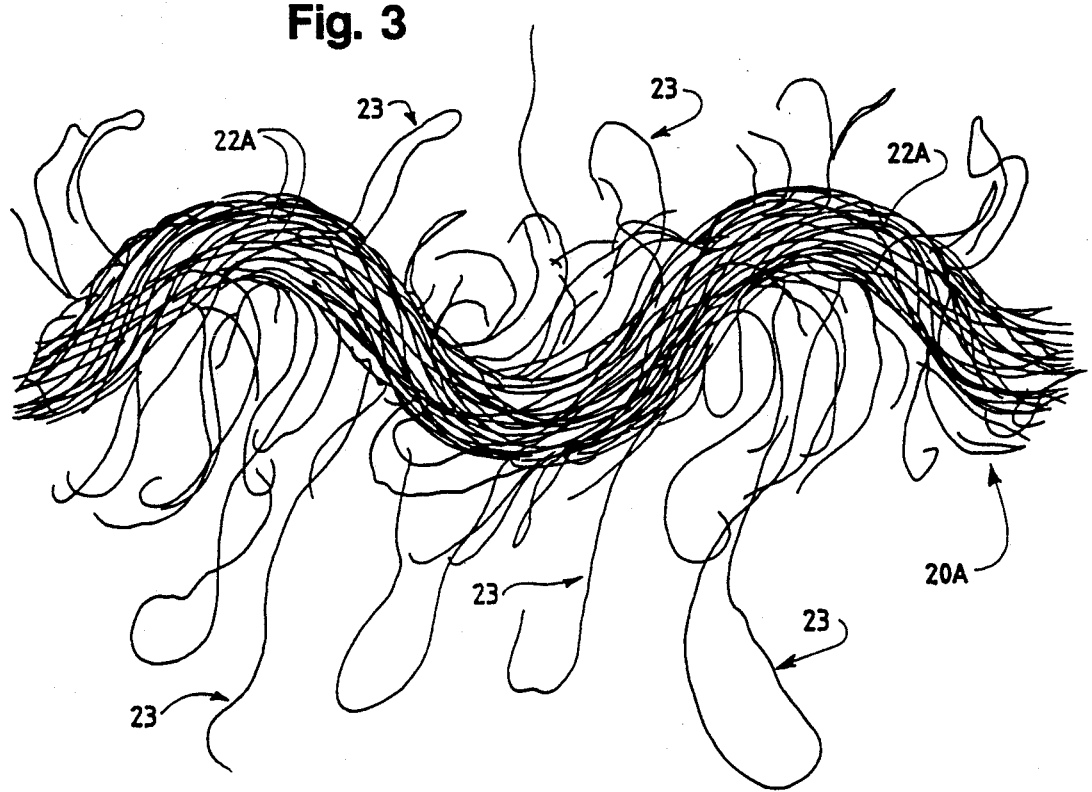
FIG. 3 is a magnified view of a fiber of an oil-based fluid absorbent cloth that has been napped.

FIG. 3 illustrates a magnified fiber 20A made up of numerous filaments 22A. This fiber 20A had been woven into a cloth (not shown) having two surfaces that are napped. The fiber 20A was removed from the cloth. Filaments 22A have sections 23 thereof that have been pulled from the fiber 20A during the napping process. These filaments 22A form part of the nap of the cloth.

Figure 4:
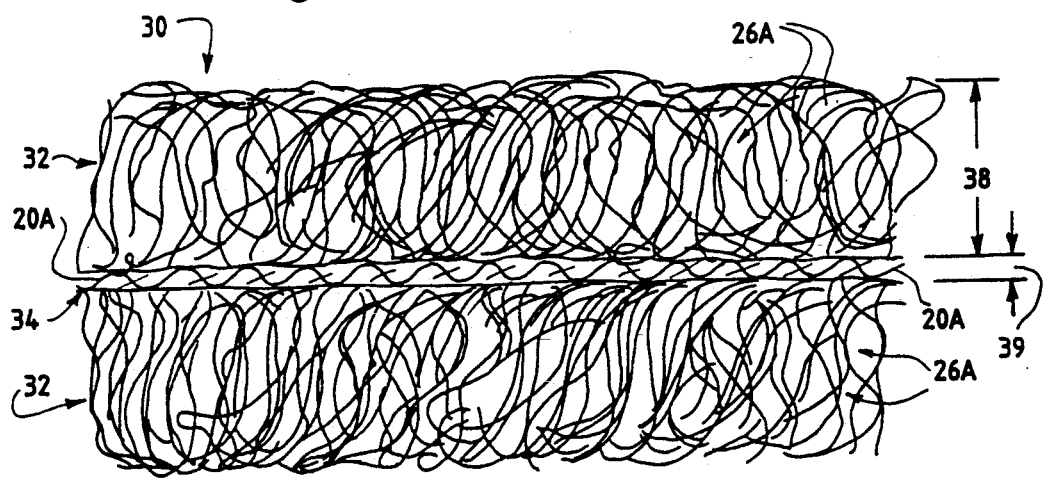
FIG. 4 is an enlarged illustration of a cross-section of a preferred absorbent cloth showing the nap.

FIG. 4 illustrates an enlarged cross-section of an oil-based fluid absorbent cloth 30 taken along the thickness thereof. Naps 32 have a relatively thin dense layer 34 therebetween. Within the nap 32 are defined voids 26A that are presently believed to enhance the absorption of oil-based fluid (not shown) by the cloth 30. The thickness 38 of the nap 32 can effect the amount of oil-based fluid absorbed by the cloth 30. The individual fibers 20A can be seen in the dense layer 34 which has a thickness 39.

FIG. 5 illustrates components that can be made into an absorbent article. The components include fibers 20 and optional flotation material 40 that are positioned on sheet form container material 42. Additional fibers and flotation material which are not shown can be present. In alternative embodiments that are not illustrated, cloth, in the form of large or small pieces, replaces the fibers or is used in conjunction with the fibers. In a further alternative embodiments that are not illustrated the floatation material is not utilized.

FIG. 6 illustrates an alternative embodiment of the absorbent article 10C having fibers (not shown) and/or cloth (not shown) held within container 44. Optionally, flotation material (not shown) can also be held within the container 44. The absorbent article 10C can also have a securement loop 46, securement grommet 48 or the like for securing the absorbent article 10C onto objects such as other absorbent articles (not shown), platforms (not shown) buoys (not shown) and the like.

FIG. 7 illustrates the components of an absorbent article prior to assembly into the absorbent article 10D of FIG. 8. Sheet-form oil-based fluid absorbent cloth 30 is provided in the desired size and shape. The flotation material 40 in the desired size and amount is placed on a surface of the cloth 30. The cloth 30 is then folded on top of the flotation material 40 and the edges of the cloth 30 are secured as by thread 50 to produce the absorbent article 10D.

Alternatively, as illustrated in FIG. 9, an absorbent article 10E can be made of the cloth 30 alone. Such an absorbent article 10E is especially useful for recovering a relatively small amount of oil-based fluid that is on a solid surface.

The method of the present invention includes the steps of applying the fibers or cloth to oil-based fluid that is on a surface. The fiber or cloth is maintained in contact with the oil-based fluid to absorb oil-based fluid and can then be removed from contact with the oil-based fluid on the surface. Absorbed oil-based fluid is temporarily held by the fiber or cloth until absorbed oil-based fluid is recovered. The method can also include the step of recovering a significant portion of the absorbed oil-based fluid from the fiber or cloth. Recovery can be accomplished by squeezing the oil-based fluid from the fiber or cloth containing the same. The method can also include the step of reapplying the fiber or cloth having oil-based fluid recovered therefrom to the oil-based fluid on the surface. The steps of applying the fiber or cloth to the oil-based fluid, retrieving the fiber or cloth from the surface, recovering absorbed oil-based fluid and reapplying the fiber or cloth to the surface can be repeated.

The term "significant", and various grammatical forms thereof, when used to define the amount of absorbed oil-based fluid recovered from the fiber or cloth, means that most of the oil-based fluid absorbed by the fiber or cloth can be recovered by selection of the proper force applied to the fiber or cloth.

The method can also be performed utilizing an absorbent article that includes: fiber and a flotation material; cloth and a flotation material; or fiber or cloth in an oil-based fluid permeable container. The flotation material is present in an amount effective to assist or provide flotation of the oil-based fluid after the fiber or cloth has absorbed oil-based fluid.

The fibers and cloth made from the fibers are highly absorbent of oil-based fluid. Also, in an environment having both oil-based fluid and water, the fibers will absorb mostly oil-based fluid and will absorb little or no water. These features of absorbing many times their weight in oil-based fluid and absorbing mostly oil-based fluid in an environment having both oil-based fluid and water are presently believed to be due to the oleophilic nature of the fiber and hence of the cloth.

The fiber suitable for use in this invention is made of a number of individual filaments that can be twisted together to form the fiber. The length of the filaments are such that the filaments can be staple or continuous filaments. The number of filaments in the fiber and the denier of the fiber are selected to achieve the desired results.

The term "staple", as used herein in its various grammatical forms in connection with the length of the filaments, defines a length of the filaments that is relatively short and typically a length of about 20 inches or less.

The term "continuous", as used herein in its various grammatical forms in connection with the length of the filament, defines a length that is greater than about 20 inches.

The term "denier", as used herein in its various grammatical forms, indicates the thickness of the fiber with a lower number representing a finer fiber and a higher number representing a courser fiber.

Representative of suitable fibers are those made of polyester, nylon, the like and mixtures thereof. A preferred fiber is a polyester fiber such as the polyester fiber Dacron ® polyester which is commercially available from DuPont, Inc., Wilmington, Del.

Although fibers of 1.5 denier and a length of 1.5 inches can be utilized, fibers having at least about 50 denier, more preferably about 60 denier and having at least about 25, preferably at least about 30, filaments per fiber perform better when the fiber is not made into a cloth.

The fibers can be made into a yarn that is made into a cloth that can have at least one surface thereof napped by a conventional process. Preferably, the yarn is a spun yarn that is produced from a number of staple fibers. Preferably, the fibers are spun to give the yarn a slack twist. The use of staple fibers and a slack twist is presently believed to result in the yarn having a large number of fiber ends and loops, respectively, at the surface of the yarn. These fiber ends and loops are available to be raised and entangled during the napping process.

The yarn is then made into the cloth preferably by knitting. The knitting stitch can be selected to provide the desired degree of elasticity in the cloth, to provide the desired structural integrity after napping and permit the desired thickness of the nap to be obtained. One method of knitting the cloth is to knit the yarn to produce a tubular form which is then split open and at least one surface thereof is napped. A suitable stitch is a plain jersey knit.

Preferably, both surfaces of the cloth are napped. Napping can be achieved by brushing the surface of the cloth to raise the ends or loops of the fiber of the yarn. Napping increases the thickness of the cloth and creates voids in the cloth which are presently believed to assist in holding the oil-based fluid. Napping also increases the surface area of the cloth which is presently believed to increase the amount of oil-based fluid that can be absorbed as compared to a cloth lacking a nap.

After napping, the cloth has at least one nap and can have a relatively dense layer adjacent to the nap. When the cloth has two naps the dense layer is disposed between the naps.

Preferably, the cloth has a total nap thickness for two naps of up to about 1.5, preferably up to about 1, millimeters (mm). (See, FIG. 4, thickness 38)

The dense layer is preferably up to about 0.2 mm thick. (See, FIG. 4, thickness 39) The thickness of the dense layer is selected to provide the desired contribution to the structural integrity of the cloth and can be eliminated especially if the cloth is to be chopped up into small pieces and held within the container.

Preferably, the ratio of the thickness of the dense layer, when present, to the total thickness of the nap is in the range of about 1:5 to about 1:15.

A square foot of the cloth having two naps, a total nap thickness of about 1 mm for both naps and a dense layer thickness of about 0.1 mm, preferably has a weight in the range of about 30 to about 60, more preferably about 35 to 55 grams (g).

The fiber and cloth are capable of absorbing at least about 5 times, preferably about 8 times and more preferably about 12 times their own weight in oil-based fluid.

Representative of the fibers are: Dacron ® polyester, 70 denier/34 filament, continuous filament, semidull; DuPont nylon (filament), 400 denier, 68 filament, semidull; Antron ® nylon, 70 denier-34 filament, ½ Z twist, semidull; DuPont nylon (staple), 1½ denier, 1½ inch semidull; and Kevlar ® aramid, type 968, 1140 denier; and the like. The Dacron ® polyester, the DuPont nylon, the Antron ® nylon and the Kevlar ® are commercially available from DuPont.

Commercially available cloths are those conventionally utilized for their thermal insulation capabilities. Representative of these cloths are styles 7660–7666 commercially available from Malden Mills, New York, N.Y. which is also available under the trade name Polar Cloth, thermal fabric style no. 19613 from Gilford Mills Inc., Greensboro, N.C. and the like. A preferred cloth is the style 7660–7666 from Malden. In excess of about 80, preferably about 90 percent of the oil-based fluid can be recovered from the Malden cloth upon application of the proper force.

The flotation material can be a cellular foam material and is preferably a flexible closed cell foam. The flotation material should exhibit minimal degradation due to exposure to the oil-based fluid and be capable of withstanding the repeated forces experienced in the recovery of the oil-based fluid from the fiber or cloth. These forces include those induced by squeezing, ringing or compressing. Also, the flotation material should maintain the ability to provide buoyancy for the fiber or cloth after exposure to oil-based fluid and repeated exposure to forces experienced in the recovery of the oil-based fluid. The flotation material preferably does not absorb oil or water as such absorbance can decrease the buoyancy of the flotation material. Some loss of buoyancy can be tolerated provided the fiber or cloth can be removed after absorbing oil-based fluid.

Representative flotation materials include polyethylene foams, polyester foams and the like. Two commercially available foams are the polyethylene foam commercially available from NMC, Inc., Zebulon, N.C. and charcoal polyester commercially available from Merriweather Foam, Inc., Barberton, Ohio. Presently, polyethylene foams are preferred.

The weight ratio of the fiber or cloth to the flotation material is dependent upon the anticipated weight of the fiber or cloth plus absorbed oil-based fluid, the amount of buoyancy provided by the flotation material, the density of the water, e.g., fresh water or salt water, upon which the oil-based fluid is floating the weight and density of the container (if present) and like factors. The weight ratio can be readily calculated based upon the above factors. The article can be made prior to the spilling of the oil-based fluid because great latitude in the weight ratio is possible.

Preferably, the weight ratio of the fiber or cloth to the flotation material is selected, and the article is designed, so that for an absorbent article used on water and having a circular cross-section about ⅓ of the article is above the oil-based fluid, about ⅓ of the article is in the oil-based fluid and about ⅓ of the article is below the surface of the water. When the Malden cloth and the polyethylene foam from NMC, Inc. are utilized the weight ratio of the cloth to the flotation material is preferably in the range of about 1:1 to 3:1.

The container that holds the fiber, cloth and/or flotation material is oil-based fluid permeable. The selection of the material of the container is based upon the contents of the container. If the contents are large pieces, the container can be net-like having openings smaller than the smallest size of the contents. If the contents are small pieces the container has smaller openings. The container is capable of withstanding the forces exerted thereon by removal from the surface of the article having absorbed oil-based fluid and by recovery of the oil-based fluid. Preferably, the container does not become clogged with the oil-based fluid to the extent that clogging prevents or inhibits absorption of the oil-based fluid by the fiber or cloth.

Suitable containers include plastic netting, cotton sheet, perforated plastic sheet and the like.

The absorbent article containing fiber or cloth, that has been shredded absorbs oil-based fluid faster than the article of sheet-form absorbent cloth. This difference in absorption rate is presently believed to be due to the increase in surface area of the fibers and the shredded cloth as opposed to the surface area of the unshredded cloth. The absorbent article made from sheet-form absorbent cloth is preferred for use as a containment boom because the rate of absorption is slower as compared to the absorbent article containing fibers or shredded cloth. The absorbent article containing fibers or shredded absorbent cloth is preferred for recovering oil-based fluid within the contained oil-based fluid spill as this absorbent article can recover oil-based fluid faster than the absorbent article containing sheet-form cloth.

The components of the absorbent article can be selected so that the absorbent article can be reused in excess of about 20 times. Selection of the cloth produced by Malden and a polyethylene foam flotation material can result in the absorbent article being utilized in excess of 40 times.

The dimensions of the absorbent article are limited only by the ability of the user to handle the absorbent article having absorbed oil-based fluid. Thus, the absorbent article can be relatively small for hand use or can be made relatively large as when a mechanical recovering apparatus will be deploying and retrieving the absorbent article and recovering the absorbed oil-based fluid therefrom.

Representative oil-based fluids that can be recovered utilizing the present method and oil-based fluid absorbent article include: crude oils; mineral oils, e.g., petroleum and petroleum-derived, e.g., lubricants; fuel oils and the like; vegetable oils, e.g., drying oils, non-drying oils and the like; animal oils, e.g., fish oils, sperm oil and the like; and the like. A representative lubricant is motor oil. Representative fuel oils include diesel fuel, gasoline and the like. Representative drying oils include linseed oil, tung oil and the like. Representative non-drying oils include caster oil, coconut oil and the like. Representative surfaces from which the oil-based fluid can be recovered are liquid surfaces and solid surfaces. Representative of the liquid surfaces are the surfaces of oceans, lakes, rivers and the like. Representative of the solid surfaces are floors, rocks, shores, river banks and the like.

The following examples are provided by way of illustration and not limitation.

EXAMPLE 1: TESTING OF ABSORBENCY OF VARIOUS FIBER SAMPLES

Fiber samples of seven commercial products were obtained from DuPont and tested to quantitatively determine how well oil-based fluid was absorbed. In this test, about three or four pieces of fiber were randomly positioned next to each other. A drop of No. 2 diesel oil was picked up with a nut picker and placed in contact with the fibers. The absorbency of the fibers was then expressed as follows. The fiber does work, the fiber works a little, the fibers works but not well, or the fiber does not work based on how the fiber pulled the diesel oil form the nut picker.

The fibers that did work were: Dacron ® polyester, 70 denier/34 filament, continuous filament, semidull; DuPont nylon (filament), 400 denier, 68 filament, semidull; and Antron ® nylon, 70 denier-34 filament, ½ Z twist, semidull.

The fiber that worked a little was DuPont nylon (staple), 1¼ denier, 1½, inch semidull.

The fiber that worked but not well was Kevlar ® aramid, type 968, 1140 denier.

The fibers that did not work were: Orlon ®; acrylic fiber staple, 3 denier, 1½ inch bright; and Lycra ® spandex.

EXAMPLE 2: ABSORPTION OF NO. 2 DIESEL FUEL

A two ounce sample of 7660 commercially available from Malden was soaked in a sample of No. 2 diesel fuel for a time period of one minute. At the end of that time period the sample was removed and weighed. The sample had absorbed 35.5 ounces of the diesel fuel. Thus, the sample had absorbed 17.75 times its own weight in diesel fuel. Also, the sample retained the diesel fuel therein very well.

A two ounce of Yukon fabric commercially available from Gilford Mills was soaked in a sample of No. 2 diesel fuel for a time period of one minute. At the end of that time period the sample was removed and weighed. The sample had absorbed 17 ounces of the diesel fuel. Thus, the sample had absorbed 8.5 times its own weight in diesel fuel. Also, the sample retained the diesel fuel therein very well.

The method and absorbent article of the present invention can be utilized to recover oil-based fluid from a variety of surfaces quickly and efficiently thus minimizing the potential environmental and health hazards of the oil-based fluid that has spilt. The oil-based fluid can be recovered and used commercially. The article can be reused repeatedly and oil-based fluid recovered therefrom after each use.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

I claim:

1. A method of recovering oil-based fluid comprising the steps of:
    applying to an oil-based fluid on a surface an oil-based fluid absorbent cloth of man-made fiber, the cloth having at least one napped surface that defines voids therein, the at least one napped surface having a total nap thickness; and
    absorbing, with the cloth, oil-based fluid in an amount of at least about 5 times the weight of the cloth.

2. The method in accordance with claim 1 further comprising the step of removing from the surface the cloth having absorbed oil-based fluid.

3. The method in accordance with claim 2 further comprising the step of recovering a significant portion of the absorbed oil-based fluid from the cloth having absorbed oil-based fluid.

4. The method in accordance with claim 1 further comprising the steps of:
    removing from the surface the cloth having absorbed oil-based fluid;
    recovering oil-based fluid from the removed cloth;
    reapplying to the oil-based fluid on the surface the cloth having oil-based fluid recovered therefrom;
    reabsorbing, with the cloth, oil-based fluid from the surface; and
    repeating the removing and recovering steps.

5. The method in accordance with claim 1 wherein the total nap thickness is up to about 1.5 mm.

6. The method in accordance with claim 1 wherein the total nap thickness is up to about 1 mm.

7. The method in accordance with claim 1 wherein the cloth has a relatively dense layer of the cloth, the dense layer having a thickness.

8. The method in accordance with claim 7 wherein a ratio of the thickness of the dense layer to the total nap thickness is in the range of about 1:5 to about 1:15.

9. The method in accordance with claim 1 wherein the cloth has a second napped surface that defines voids therein and a relatively dense layer of the cloth positioned between the two napped surfaces, the dense layer having a thickness.

10. The method in accordance with claim 9 wherein the total nap thickness is up to about 1.5 mm.

11. The method in accordance with claim 9 wherein the total nap thickness is up to about 1 mm.

12. The method in accordance with claim 9 wherein a ratio of the thickness of the dense layer to the total nap thickness is in the range of about 1:5 to about 1:15.

13. The method in accordance with claim 1 wherein the cloth is secured about a flotation material and the method further comprises the step of assisting the flotation of the cloth at the surface with the flotation material.

14. The method in accordance with claim 13 wherein the cloth is secured about pieces of a second absorbent cloth of man-made fiber having at least one napped surface that defines voids therein.

15. The method in accordance with claim 1 wherein the cloth has sufficient structural integrity to be utilized in the method in the absence of another container.

16. The method in accordance with claim 1 wherein the cloth is made from a yarn made from fibers spun to give the yarn a slack twist.

17. A method of recovering oil-based fluid comprising the steps of:
applying to an oil-based fluid on a surface an oil-based fluid absorbent cloth of man-made fiber and flotation material, the cloth having at least one napped surface that defines voids therein, the at least one napped surface having a total nap thickness; and
absorbing, with the cloth, oil-based fluid in an amount of at least about 5 times the weight of the cloth, wherein the flotation material can at least in part assist in maintaining the cloth having absorbed oil-based fluid on the surface.

18. The method in accordance with claim 17 wherein the total nap thickness is up to about 1.5 mm.

19. The method in accordance with claim 17 wherein the total nap thickness is up to about 1 mm.

20. The method in accordance with claim 17 wherein the cloth has a relatively dense layer of cloth, the dense layer having a thickness.

21. The method in accordance with claim 20 wherein a ratio of the thickness of the dense layer to the total nap thickness is in the range of about 1:5 to about 1:15.

22. The method in accordance with claim 17 wherein the cloth has a second napped surface that defines voids therein and a relatively dense layer of the cloth positioned between the two napped surfaces, the dense layer having a thickness.

23. The method in accordance with claim 22 wherein the total nap thickness is up to about 1.5 mm.

24. The method in accordance with claim 22 wherein the total nap thickness is up to about 1 mm.

25. The method in accordance with claim 22 wherein a ratio of the thickness of the dense layer to the total nap thickness is in the range of about 1:5 to about 1:15.

26. The method in accordance with claim 17 wherein the cloth has sufficient structural integrity to be utilized in the method in the absence of another container.

27. The method in accordance with claim 17 wherein the cloth is made from a yarn made from fibers spun to give the yarn a slack twist.

28. A method of recovering oil-based fluid, said method comprising the steps of:
applying an oil-based fluid absorbent cloth of man-made fiber to an oil-based fluid, the cloth having at least a portion thereof that is napped so as to raise ends and loops of the man-made fibers and define voids; and
absorbing the oil-based fluid into the napped portion of the cloth.

29. The method in accordance with claim 28 wherein the applying step results in the cloth absorbing oil-based fluid in an amount of at least about 5 times the weight of the cloth.

* * * * *